F. A. CALLEY.
BAKING APPARATUS.
APPLICATION FILED DEC. 15, 1909.
996,971.
Patented July 4, 1911.
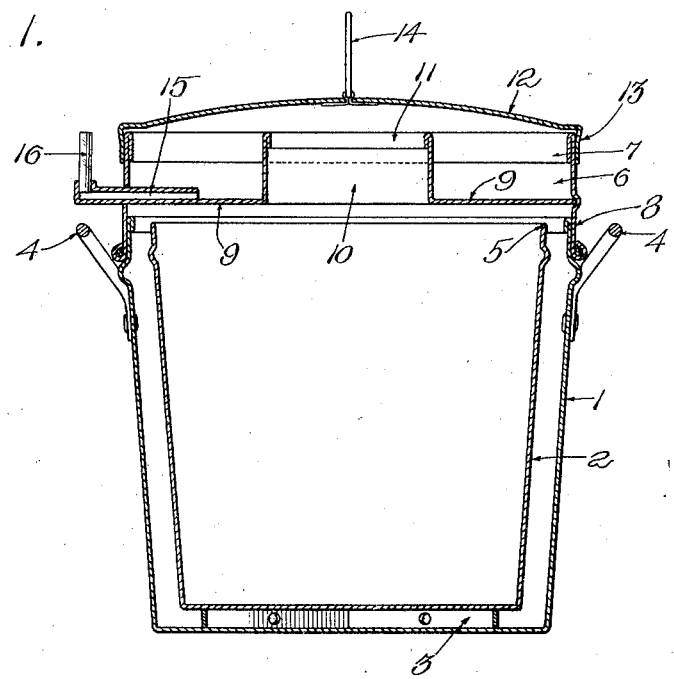
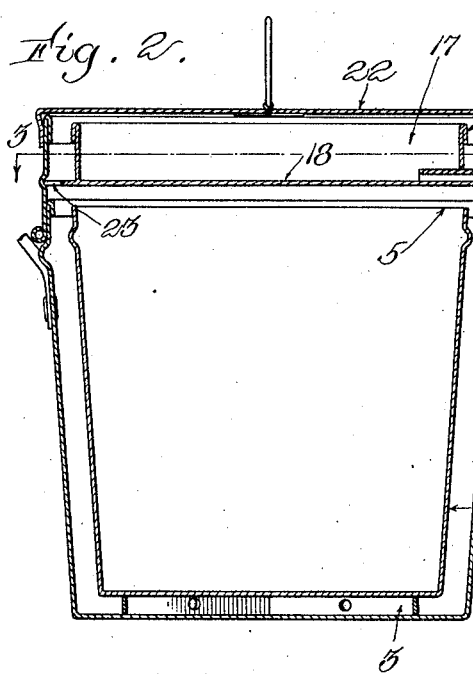
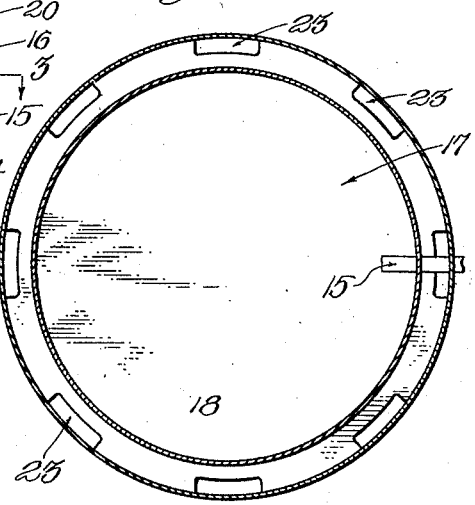
Witnesses:
Edward Maxwell
M. J. Spalding
Inventor:
Freeman A. Calley,
by Geo. W. Maxwell
Attorney.

UNITED STATES PATENT OFFICE.

FREEMAN A. CALLEY, OF FRANKLIN, NEW HAMPSHIRE.

BAKING APPARATUS.

996,971.

Specification of Letters Patent. Patented July 4, 1911.

Application filed December 15, 1909. Serial No. 533,171.

*To all whom it may concern:*

Be it known that I, FREEMAN A. CALLEY, a citizen of the United States, and resident of Franklin, in the county of Merrimack and State of New Hampshire, have invented an Improvement in Baking Apparatus, of which the following description, in connection with the accompanying drawings, is a specification, like letters on the drawings representing like parts.

My present invention is an improvement on my patented apparatus, No. 909,988, patented January 19, 1909, whereby its capacity is enlarged without increasing the external size of the holding vessel, and it is rendered more easy to clean, and generally more efficient than my preceding apparatus.

The present apparatus is intended not only for baking beans, but meat, poultry, brown bread, and is otherwise adapted for general use.

The constructional details and further advantages of my invention will be pointed out more fully in the following description and the invention further defined in the claims.

In the drawings, Figure 1 is a central vertical sectional view of the preferred embodiment of my invention; Fig. 2 is a similar sectional view of a modified construction; and Fig. 3 is a horizontal sectional view taken on the line 3—3, Fig. 2.

The apparatus consists, as before, of an outside can or receptacle 1 and an inner can or receptacle 2, separated by any suitable means, as by a separator 3 placed between their bottoms. The outside receptacle has opposite handles 4, and the inner receptacle, as herein shown, extends at its top edge 5 approximately even with the top edge of the outer receptacle, thereby gaining space for a greatly increased amount of food to be baked. This is made possible by the construction of the top, which my present invention primarily relates to. As shown in Fig. 1, I provide a water tank 6 whose outer sides extend upwardly at 7 and continue downwardly to constitute a flange 8 which fits tightly down over the upper portion of the receptacle 1. The bottom 9 of this water tank extends straight across the apparatus. The tank is provided at its middle with a large central hole 10 opening at 11 approximately flush with the top edge of the tank. A cover 12 has a peripheral flange 13 which fits tightly over the top edge 7 of the tank and is provided with a handle 14 whereby it may be removed from said tank. A vent, herein shown as a small tube 15, soldered or otherwise secured on the bottom 9 of the tank, extends out through the side wall of the tank and is provided at its outer end with a vertical glass sight tube 16.

In using the apparatus, the top is removed from the receptacles, and the inner receptacle 2 is filled with the desired quantity of material which is to be baked. Thereupon the tank portion of the top is put in place, as shown in Fig. 1, the tank is filled to the desired height with water, and the cover 12 is then put in place. As the baking heat raises the temperature of the water, the steam therefrom rises and passes down through the opening 10 in large volume, surrounding the receptacle 2 and permeating its contents. As the entire apparatus is practically sealed, this steam soon attains a superheated condition, all as fully explained in my before-mentioned patent. The user can ascertain at a glance by looking at the tube 16 at any time the height of the water remaining in the tank 6, and as soon as the water has become nearly exhausted therefrom, that fact will be indicated by the escape of steam through the tubes 15, 16, said tube 15 being then uncovered by the lowering of the water in the tank 6.

In Figs. 2 and 3 I have carried out the same object by making a central tank 17 whose bottom 18 extends beyond the outer walls 19 of the tank to a vertical inclosing flange 20 of the top whose lower portion 21 fits down onto the receptacle 1 in the same manner as the flange 8 of the previously described top, the whole being closed by a cover 22 substantially the same as before. The tubes 15 and 16 are the same, the former being soldered onto the bottom of the tank the same as before. To permit the communication of the steam from the tank 18 to the contents below, I provide a series of holes 23 through the outer portion of the bottom next to the vertical flange 20. The operation is substantially the same as before, excepting that the steam is not driven in such large volume directly onto the contents of the inner receptacle 2 as in the preferred construction. I also prefer the construction shown in Fig. 1 as it is easy to clean. In both instances, however, the apparatus is much easier to clean than my previous constructions inasmuch as the removal of the cover leaves all the interior parts in position to be very readily inspected and cleaned.

Besides the provision for easily cleaning the inside of the top, I wish to make clear the important advantage before mentioned that this provision for a large flow of steam and the construction in general affords quicker baking of the beans, meat, or the like, and the user is able to tell when the meat is nearly done by inspecting the tube. As explained in my previous patent, the amount of water is regulated to the necessities of the case, so that when the water is almost out the user may know that the baking is practically finished, and when the water is out, the blowing out of the steam through the tube 15 also indicates that fact. By having the handles at the side, the contents of the apparatus may be turned out very readily simply by tipping the entire apparatus edgewise, the top having first been removed.

Having described my invention, what I claim as new, and desire to secure by Letters Patent is:—

1. An apparatus of the kind described, comprising two cans, one within the other, having an annular steam-space between them, a top member fitting tightly onto the outer can and inclosing the inner can and intervening steam-space, and provided with a transverse bottom and two upwardly extending concentric annular walls forming two chambers, one for water and the other for steam from said water, the latter chamber having free communication through said bottom with said annular steam-space, a cover for said top member, and a signal tube extending along said bottom from the water chamber out through the side of the top member and terminating in an upright glass portion.

2. In an apparatus of the kind described, a lower receptacle, a top fitting thereon having a bottom extending entirely across the same, and two outer walls extending upwardly therefrom approximately parallel to each other, the outermost of said walls being slightly higher than the other wall, a cover removably and tightly fitting the outermost of said walls, said bottom having a series of holes 23 through the portion of said bottom which is between said walls, and the inner of said two walls forming with said bottom a tank, open at its upper side, to hold water and deliver steam therefrom to the space between the said walls and thence through said holes to the lower receptacle.

3. In combination, a lower outer receptacle, an inner receptacle disposed therein to leave an annular space between said receptacles, a top fitting the outer of said receptacles with a removable closure fitted thereto, said top carrying a water tank and having walls spaced apart adjacent its periphery, the annular space thus formed being directly above the aforesaid annular space, and communications being provided from said tank to the latter annular space and also between said annular spaces at intervals therearound.

In testimony whereof, I have signed my name to this specification, in the presence of two subscribing witnesses.

FREEMAN A. CALLEY.

Witnesses:
 THOMAS F. CLIFFORD,
 AGNES L. GAHAGAN.